US012437609B2

(12) United States Patent
Hilbert et al.

(10) Patent No.: US 12,437,609 B2
(45) **Date of Patent: *Oct. 7, 2025**

(54) GAMING SYSTEMS AND METHODS FOR ADAPTABLE PLAYER AREA MONITORING

(71) Applicant: LNW Gaming, Inc., Las Vegas, NV (US)

(72) Inventors: Scott Hilbert, Sparks, NV (US); Martin Lyons, Henderson, NV (US); Rolland Steil, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 281 days.

This patent is subject to a terminal disclaimer.

(21) Appl. No.: 18/306,393

(22) Filed: Apr. 25, 2023

(65) Prior Publication Data

US 2023/0260361 A1 Aug. 17, 2023

Related U.S. Application Data

(63) Continuation of application No. 17/194,394, filed on Mar. 8, 2021, now Pat. No. 11,704,965.

(60) Provisional application No. 62/987,968, filed on Mar. 11, 2020.

(51) Int. Cl.
*G07F 17/32* (2006.01)

(52) U.S. Cl.
CPC ...... *G07F 17/3227* (2013.01); *G07F 17/3206* (2013.01)

(58) Field of Classification Search
CPC ............. G07F 17/3227; G07F 17/3206; G07F 17/3237; G07F 17/3239; G07F 17/3241
See application file for complete search history.

(56) References Cited

U.S. PATENT DOCUMENTS

| | | | |
|---|---|---|---|
| 6,142,876 | A | 11/2000 | Cumbers |
| 8,047,914 | B2 | 11/2011 | Morrow |
| 8,317,609 | B2 | 11/2012 | Morrow |
| 8,480,487 | B2 | 7/2013 | Morrow |
| 8,556,714 | B2 | 10/2013 | Ward et al. |
| 8,721,427 | B2 | 5/2014 | Kelly et al. |
| 8,840,470 | B2 | 9/2014 | Zalewski et al. |
| 8,968,092 | B2 | 3/2015 | Gomez et al. |
| 9,128,032 | B2 | 9/2015 | Carson et al. |
| 9,128,033 | B2 | 9/2015 | Lee et al. |
| 9,269,216 | B2 | 2/2016 | Keilwert |
| 9,269,219 | B2 | 2/2016 | Lyons et al. |
| 9,342,948 | B2 | 5/2016 | Aoki et al. |
| 9,626,807 | B2 | 4/2017 | Lyons et al. |
| 9,922,491 | B2 | 3/2018 | Kelly et al. |

(Continued)

*Primary Examiner* — Kevin Y Kim

(57) ABSTRACT

A gaming machine includes at least one image sensor for capturing an image including a player area associated with the gaming machine and logic circuitry in communication with the image sensor. The logic circuitry establishes a facial image mask defining an area of interest within the player area, receives the captured image from the image sensor, applies the facial image mask to the captured image to extract player image data from the captured image data, detects any faces within the player image data, compares, in response to detecting a face of a player within the player image data, the detected face with a player database to identify a player account associated with the player, and links, in response to identifying a matching player account based on the comparison, the matching player account to activities of the player at the gaming machine.

21 Claims, 11 Drawing Sheets

(56) References Cited

U.S. PATENT DOCUMENTS

| | | | |
|---|---|---|---|
| 10,083,568 | B2 | 9/2018 | Kelly et al. |
| 10,089,817 | B2 | 10/2018 | Kelly et al. |
| 10,134,195 | B2 | 11/2018 | Lyons et al. |
| 2003/0103212 | A1 | 6/2003 | Westphal et al. |
| 2003/0125109 | A1 | 7/2003 | Green |
| 2011/0069155 | A1 | 3/2011 | Cho et al. |
| 2013/0005443 | A1 | 1/2013 | Kosta et al. |
| 2013/0274007 | A1 | 10/2013 | Hilbert et al. |
| 2014/0004936 | A1 | 1/2014 | Morrow |
| 2015/0024846 | A1 | 1/2015 | Gomez et al. |
| 2018/0322728 | A1 | 11/2018 | Kelly et al. |
| 2020/0035064 | A1 | 1/2020 | Soukup et al. |

GAMING SYSTEMS AND METHODS FOR ADAPTABLE PLAYER AREA MONITORING

CROSS-REFERENCE TO RELATED APPLICATIONS

This patent application is a continuation of U.S. patent application Ser. No. 17/194,394, filed Mar. 8, 2021, which claims the benefit of priority to U.S. Patent Application No. 62/987,968, filed Mar. 11, 2020, both the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021 S G Gaming, Inc.

FIELD

The present disclosure relates generally to gaming systems, apparatus, and methods and, more particularly, to adaptive monitoring of a player area for systems having image sensors mounted in a plurality of different configurations.

BACKGROUND

Player tracking and other image-based technology are increasing within the gaming industry. Player tracking using image analysis may be used, for example, to facilitate players linking his or her gaming session at a gaming machine to his or her player account without requiring the players to manually link to the player account (e.g., swiping a player account card, using a phone to interface with the gaming machine, manually inputting a code associated with the player, etc.). To perform the player tracking, one or more image sensors, which may be combined within a camera, are installed at or near the gaming machine to capture images of a player area associated with the gaming machine. More specifically, the image sensors may be configured to capture images of a player's face for identification.

However, various gaming machines are designed with a variety of camera mounting positions, and some gaming machines may be retrofitted to include cameras. The variety of positions and configurations of cameras across gaming machines may result in at least some of the gaming machines being unable to capture players of varying heights and sitting positions. For example, the camera may be mounted at a position relatively higher than the height of most players and oriented to face downwards. However, a relatively tall player may be positioned at the gaming machine outside of an area monitored by the camera, thereby resulting in the tall player not being identified. FIG. 1A depicts an example gaming machine with three mounting positons for cameras (indicated by the field-of-views ΘNa, ΘNb, and ΘNc). The three mounting positions vary in vertical height and may result in clipping (i.e., not capture the entirety of a player's face or head) for players of a relatively tall or short height. FIG. 1B, for example, depicts potential images from the three camera mountings, and some players may be clipping or altogether undetected for certain camera mounting positions. In addition to problems raised by changes in the vertical height of the camera, some gaming machines may position the camera at a horizontal bias or shift. FIG. 2 is an example image captured by cameras at three different horizontal biases by at least some prior art systems. Similar to the images of FIG. 1B, clipping may be pronounced in certain horizontal biases.

Accounting for the limited camera view using mechanical means (e.g., a motorized arm that adjusts the camera) may not be cost effective and/or require additional maintenance. Accordingly, new systems and methods are needed for facilitating player tracking using image analysis for a plurality of camera mounting configurations.

SUMMARY

According to one aspect of the present disclosure, a gaming machine includes at least one image sensor for capturing an image including a player area associated with the gaming machine and logic circuitry in communication with the image sensor. The logic circuitry establishes a facial image mask defining an area of interest within the player area based at least partially on a physical orientation of the image sensor relative to the player area, receives the captured image from the image sensor, applies the facial image mask to the captured image to extract player image data representing at least the area of interest from the captured image data, detects any faces within the player image data, compares, in response to detecting a face of a player within the player image data, the detected face with a player database storing a plurality of player account identifies linked to respective facial features to identify a player account associated with the player, and links, in response to identifying a matching player account based on the comparison, the matching player account to activities of the player at the gaming machine.

According to another aspect of the disclosure, a method for player tracking using a gaming system including a gaming machine and logic circuitry is provided. The gaming machine includes at least one image sensor. The method includes capturing, by the image sensor, an image of a player area associated with the gaming machine, establishing, by the logic circuitry, a facial image mask defining an area of interest within the player area based at least partially on a physical orientation of the image sensor relative to the player area, receiving, by the logic circuitry, the captured image from the image sensor, applying, by the logic circuitry, the facial image mask to the captured image to extract player image data representing at least the area of interest from the captured image data, detecting, by the logic circuitry, any faces within the player image data, comparing, by the logic circuitry and in response to detecting a face of a player within the player image data, the detected face with a player database storing a plurality of player account identifiers linked to respective facial features to identify a player account associated with the player, and linking, by the logic circuitry and in response to identifying a matching player account based on the comparison, the matching player account to activities of the player at the gaming machine.

According to yet another aspect of the disclosure, a gaming system includes a gaming machine and logic circuitry. The gaming machine includes at least one image sensor that captures an image of a player area associated with the gaming machine. The logic circuitry is in communication with the image sensor. The logic circuitry establishes a facial image mask defining an area of interest within the player area based at least partially on a physical orientation of the image sensor relative to the player area, receives the captured image from the image sensor, applies the facial image mask to the captured image to extract player image data representing the area of interest within the player area from the captured image data, detects any faces within the player image data, compares, in response to detecting a face of a player within the player image data, the detected face with a player database storing a plurality of player account identifiers linked to respective facial features to identify a player account associated with the player, and links, in response to identifying a matching player account based on the comparison, the matching player account to activities of the player at the gaming machine. The gaming system may be incorporated into a single, freestanding gaming machine.

Additional aspects of the disclosure will be apparent to those of ordinary skill in the art in view of the detailed description of various embodiments, which is made with reference to the drawings, a brief description of which is provided below.

Figure 1A:
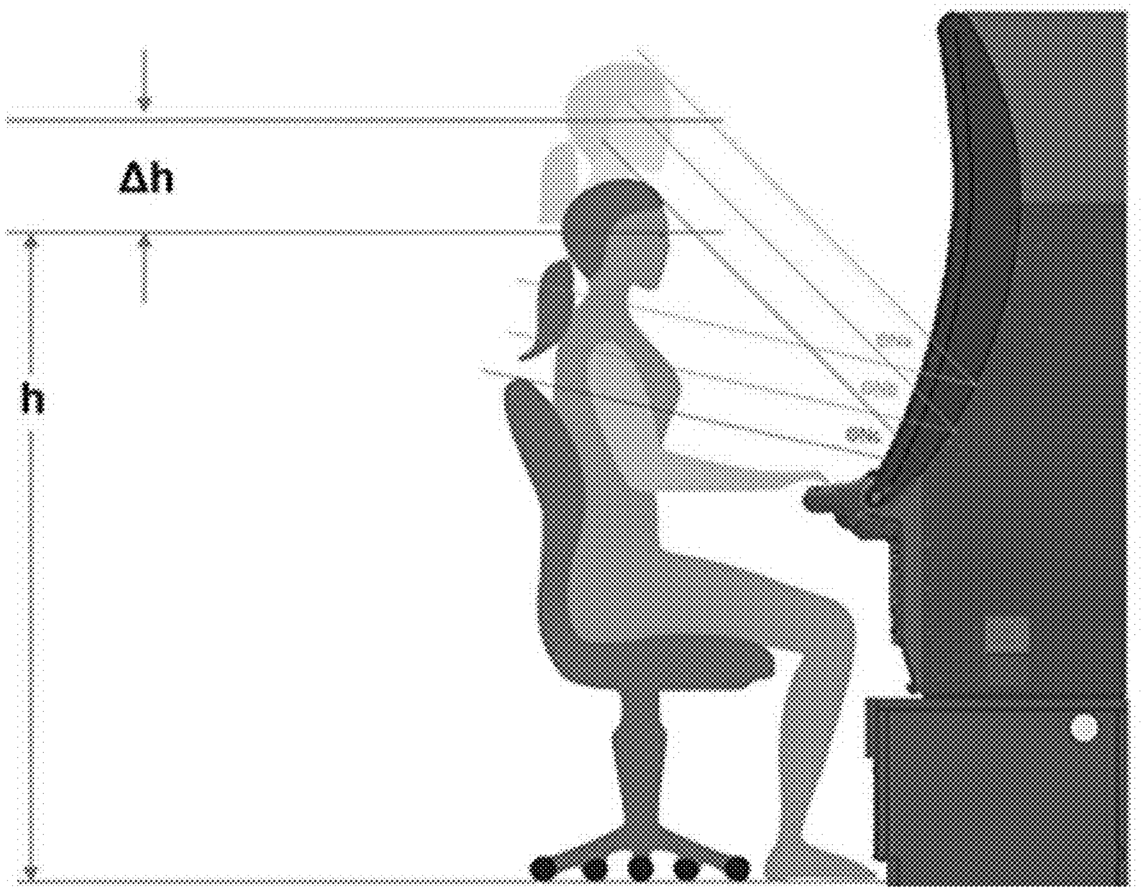
PRIOR ART FIG. 1A
FIG. 1A is a side view of an example gaming machine with three different camera mounting points.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

The systems and methods described herein facilitate player tracking using image analysis across a plurality of gaming machine configurations. That is, the systems and methods described herein incorporate wide field-of-view (FOV) cameras and/or other suitable devices for capturing an expanded view of a player area associated with the gaming machine. The systems and methods then apply a pixel mask to a captured image (or set of captured images) to extract the pixels in which players' faces or heads are assumed to be present when playing at the gaming machines. This may account for players of a variety of heights and/or a variety of sitting positions at the gaming machine in addition to various camera mounting positions on or around the gaming machine. That is, the pixel mask may not be the same for different gaming machines. The extracted pixels may then be analyzed using one or more suitable image analysis techniques to detect any faces and, if a face is detected, an identity of a player associated with the face. The remaining pixels from the captured image may be ignored to reduce the computational resource cost of player tracking, and the adjustable pixel mask enables the systems and methods described herein to retain the benefit of cross-configuration player-tracking systems for a plurality of gaming machines.

Figure 3:
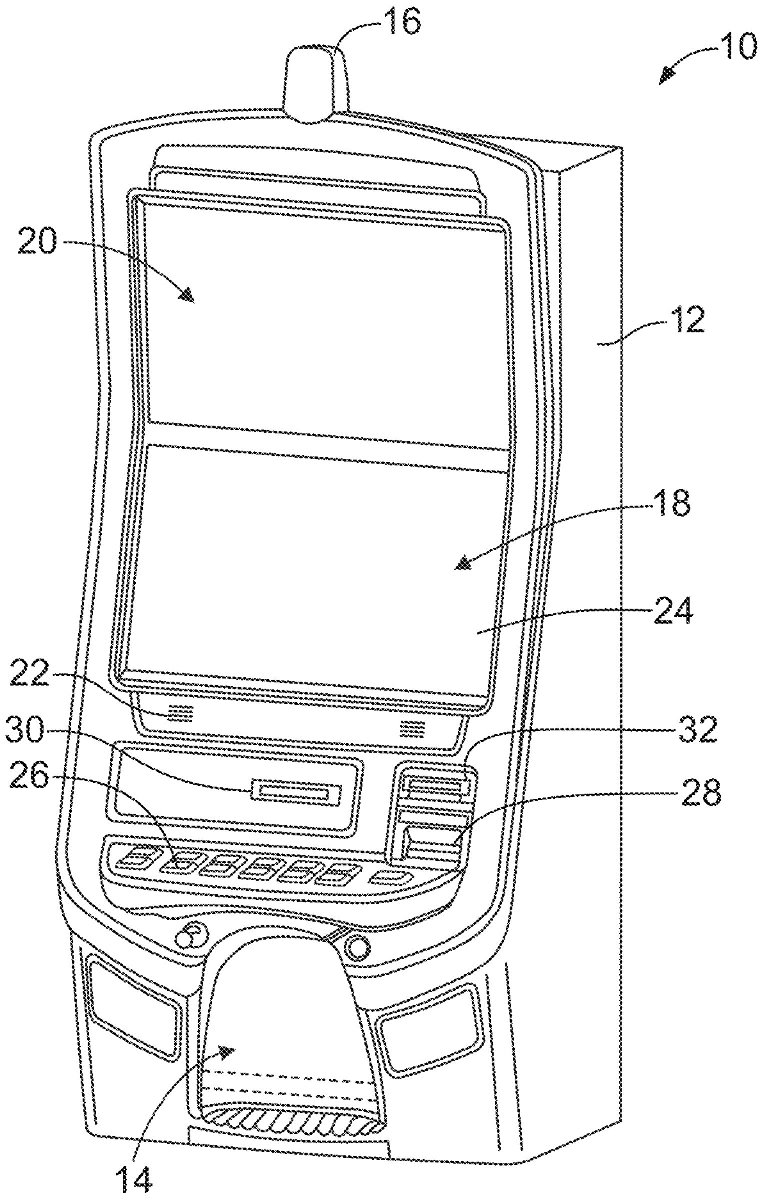
FIG. 3 is a perspective view of a free-standing gaming machine according to one or more embodiments of the present disclosure.

Referring to FIG. 3, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 3 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 5). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 5), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 4:
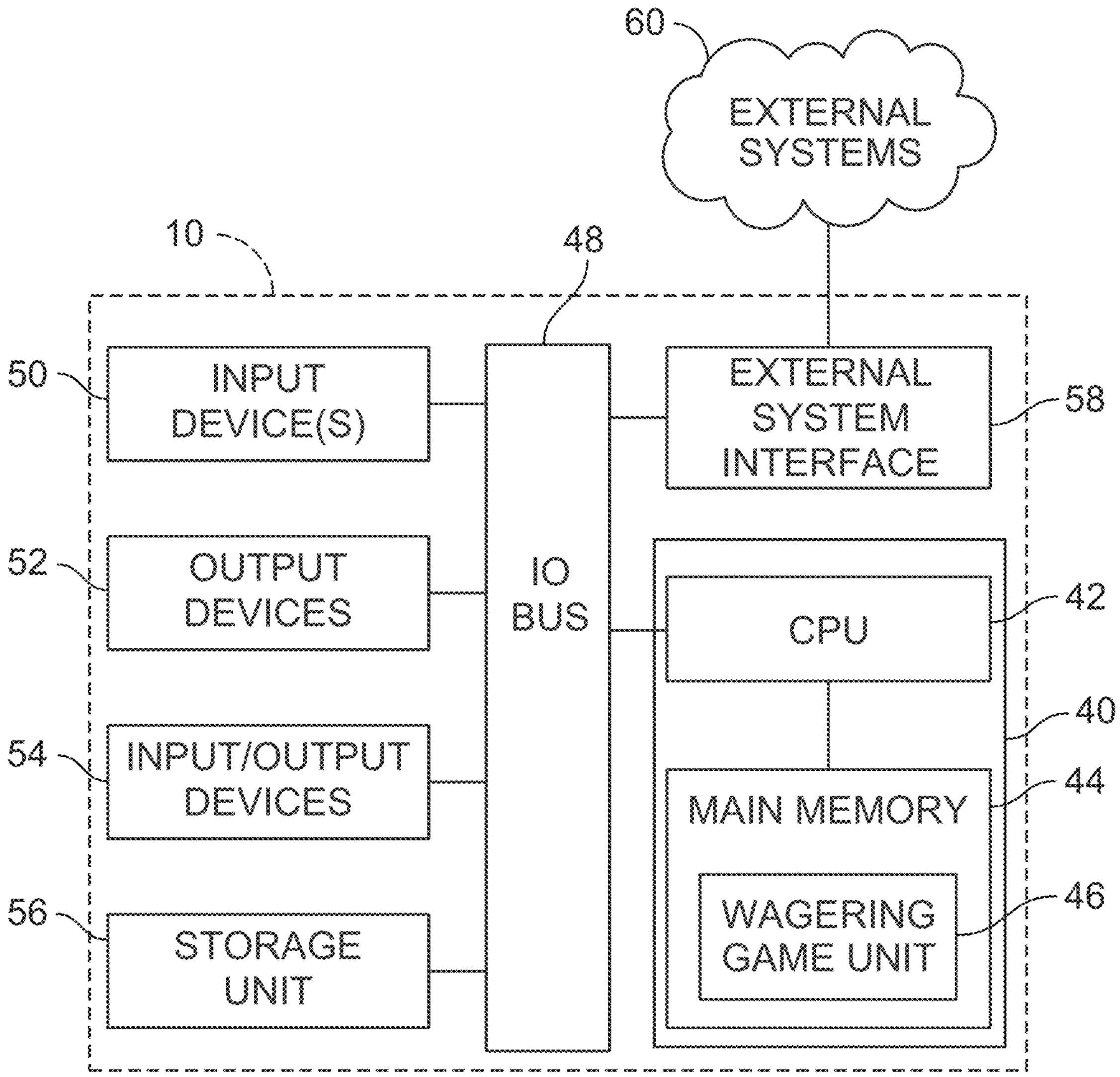
FIG. 4 is a schematic view of a gaming system according to one or more embodiments of the present disclosure.

Turning now to FIG. 4, there is shown a block diagram of the gaming-machine architecture. The gaming machine 10 includes game-logic circuitry 40 securely housed within a locked box inside the gaming cabinet 12 (see FIG. 3). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

Figure 1B:
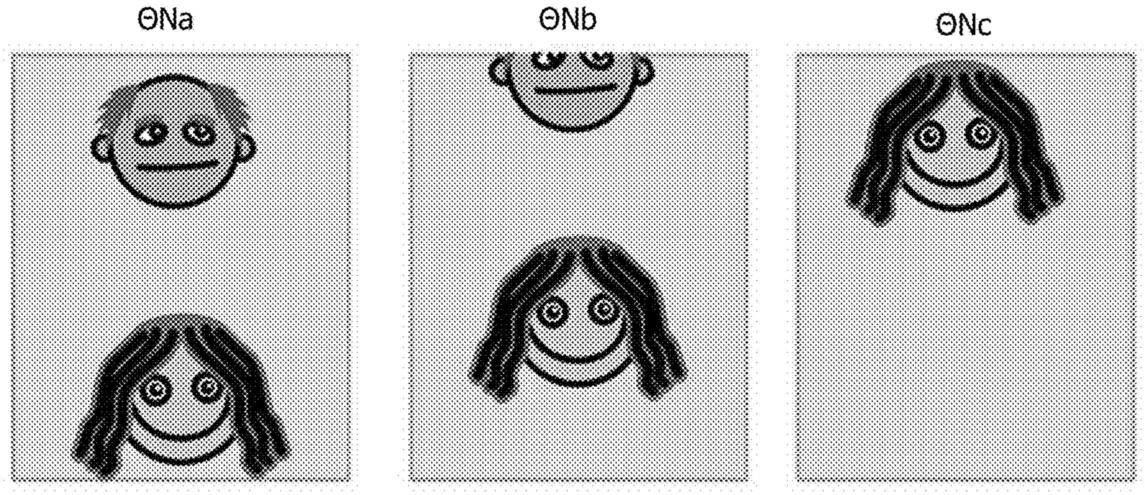
PRIOR ART FIG. 1B
FIG. 1B depicts three example images captured by the example gaming machine of FIG. 1A from the respective three camera mounting points according to at least some prior art systems.

The game-logic circuitry 40 is also connected to an input/output (I/O) bus 48, which can include any suitable bus technologies, such as an AGTL+ frontside bus and a PCI backside bus. The I/O bus 48 is connected to various input devices 50 (e.g., one or more image sensors), output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 4. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 5:
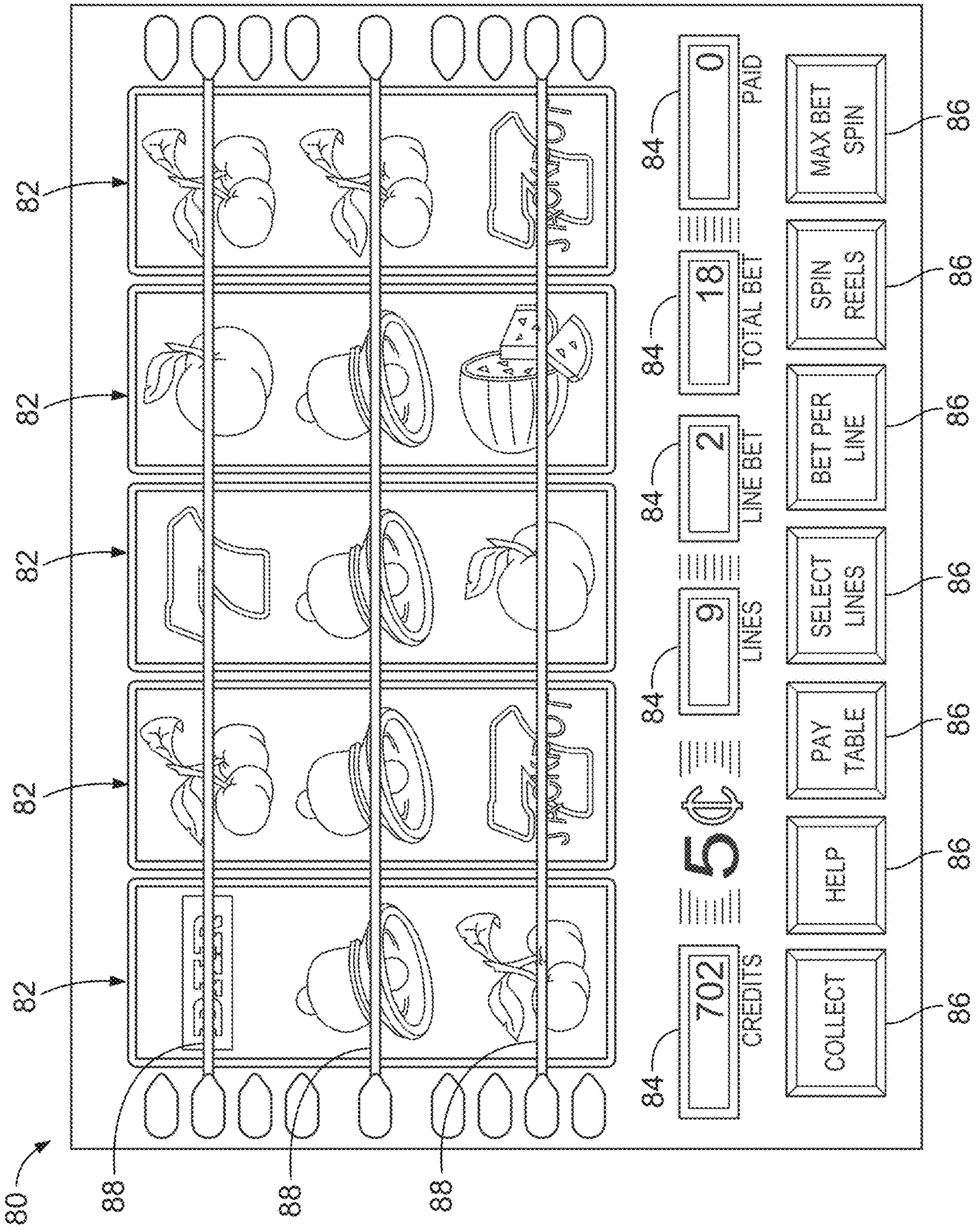
FIG. 5 is an image of an exemplary basic-game screen of a wagering game displayed on a gaming machine, according to one or more embodiments of the present disclosure.

Referring now to FIG. 5, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 3. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 3, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 6:
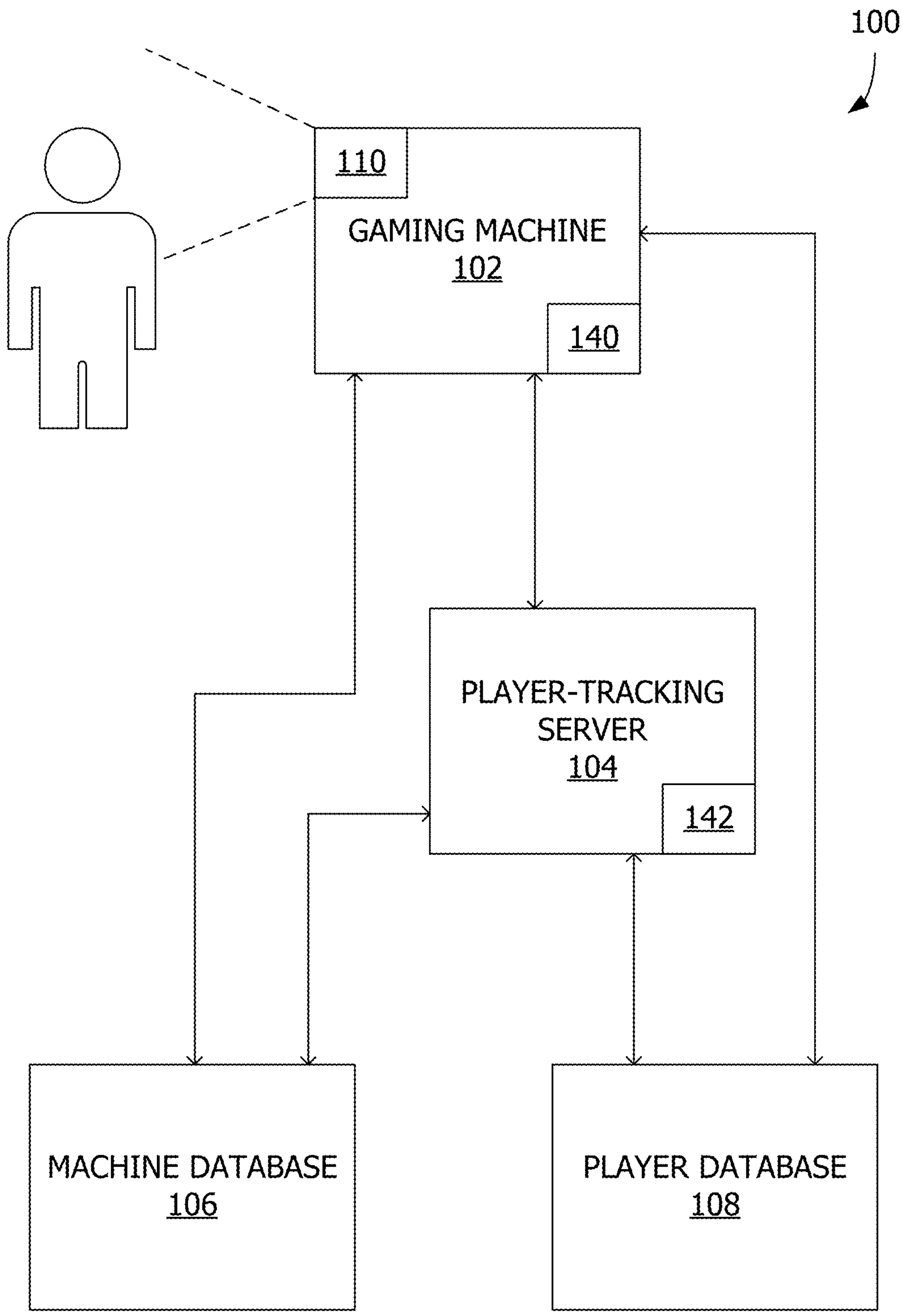
FIG. 6 is a block diagram of an example gaming system according to one or more embodiments of the present disclosure.

Referring now to FIG. 6, an example gaming system 100 for player tracking includes a gaming machine 102, a player-tracking server 104, a machine database 106, and a player database 108. In other embodiments, the system 100 may include additional, fewer, or alternative devices in one or more configurations, including those described herein.

The gaming machine 102 may be substantially similar to the gaming machine 10 (shown in FIG. 1) or another suitable subsystem. For example, the gaming machine 102 may be a gaming table and any associated gaming devices, such as a card shuffler, card shoe, and the like. In the example embodiment, the gaming machine 102 includes at least one image sensor 110 and logic circuitry 140 similar to the logic circuitry 40 shown in FIG. 4. The image sensors 110 may be incorporated within one or more cameras associated with the gaming machine 102. The image sensors 110 may be installed at the gaming machine 102 or separate from the machine 102. For example, in embodiments in which the gaming machine 102 is a gaming table, the image sensors 110 may be incorporated within cameras installed around the gaming table. The image sensors 110 are configured to capture one or more images of a player area associated with the gaming machine 102. The player area may be an area in which a player typically resides during play of a game at the gaming machine 102. The player area may be narrowed to include a certain feature or set of features of players participating at the gaming machine 102, such as an area in which players' faces are typically located to play at the gaming machine 102. In certain embodiments, the gaming machine 102 may be associated with a plurality of player areas. It is to be understood that although the images captured by the image sensors 110 are described herein as including the player area, the images may only include a portion of the player area.

In the example embodiment, as described in detail herein, the image sensors 110 are part of a wide field-of-view (FOV) camera. The camera is configured to capture images of a relatively wide area in front of the camera. In some examples, this wide area may be result in the captured image having a "fisheye" effect where objects at the edges of the image appear stretched due in part to the configuration of lens and the image sensors 110. In certain embodiments, the camera may be configured to alleviate this effect to produce a flat image. In other embodiments, the gaming machine 102 may include a plurality of cameras and/or adjustable cameras having different orientations to account for a plurality of installation or mounting points associated with the gaming machine 102.

In the example embodiment, the logic circuitry 140 is in communication with the image sensors 110 to cause the image sensors 110 to capture images and to receive the captured images. The captured images may be used to detect and identify players at the gaming machine 102. In some embodiments, the logic circuitry 140 is configured to receive a stream of captured images (i.e., a video stream) and store the stream in a video buffer for detecting players. If no player is detected in an image, the image is discarded and the next image is retrieved from the image buffer. In certain embodiments, the logic circuitry 140 may cause the image sensors 110 to capture one or more images of the player area periodically or in response to one or more contextual conditions. The contextual conditions may include, for example, a proximity sensor in communication with the logic circuitry 140 detecting an object, a credit input being detected, user input at the gaming machine 102 being detected, and/or any other suitable condition that may indicate a player is potentially present at the gaming machine 102.

The image analysis performed by the logic circuitry 140 may include several functions. In the example embodiment, the logic circuitry 140 is configured to perform at least two functions: (i) detecting any faces within the image (or a subset of the image as described herein) and (ii) in response to detecting a player's face, determining an identity of the player based on the detected face. Other suitable functions, such as filtering through a plurality of detected faces to determine which face belongs to the player at the gaming machine 102, may be performed by the logic circuitry. In at least some embodiments, the image analysis is performed using a subset of the image or images captured by the image sensors 110. In one example, if multiple images are captured, an image may be selected from the multiple images by the logic circuitry 140 for image analysis. In another example, a portion of a captured image is used for image analysis. The selected image or portion of the image used for image analysis may be determined based at least partially on the configuration of the image sensors 110 relative to the player area. In the example embodiment with the wide FOV camera, at least some of the captured image may not be used for image analysis because players at the gaming machine 102 (or at least the player features relevant to image analysis) typically do not occupy the physical space corresponding to the unused pixels of the captured image. Extracting the one or more potentially relevant areas of interest from the captured image may reduce the computational cost of subsequent functions, such as face detection and identification.

Figure 7:
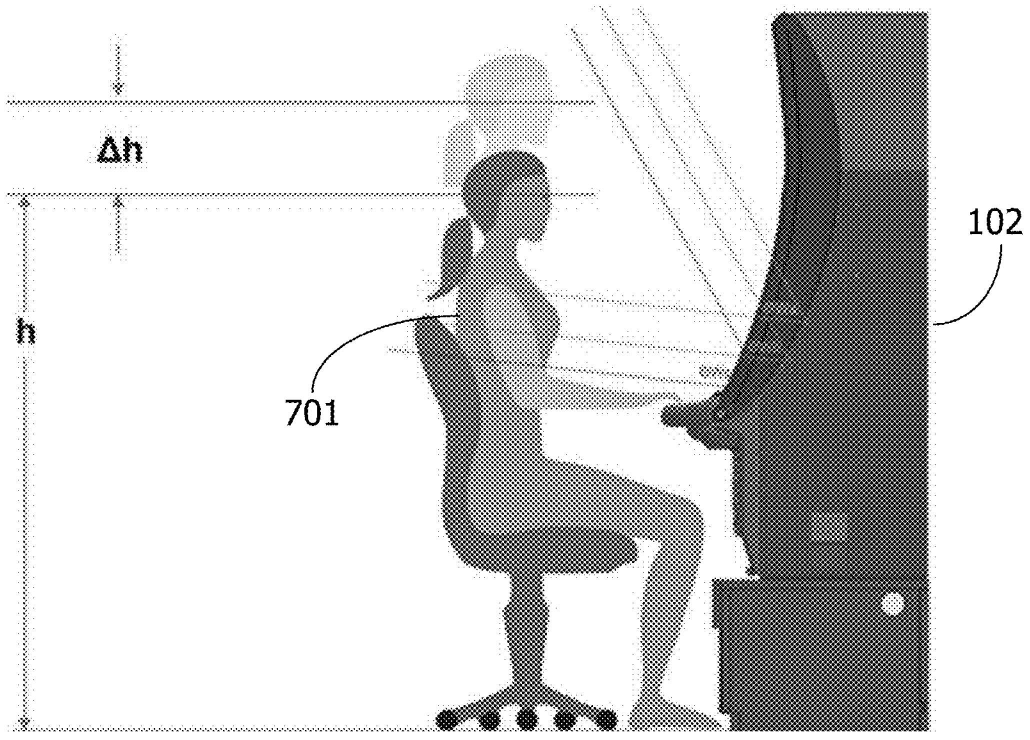
FIG. 7 is a side view of an example gaming machine with a wide field-of-view camera according to one or more embodiments of the present disclosure.

FIG. 7 depicts a side view of a player 701 at the gaming machine 102 with three different mounting positions for the wide FOV camera. Although the gaming machine 102 may not be configured for all three camera mounting positions, it is to be understood that the mounting positions shown are for exemplary purposes only to illustrate different camera mounting positions across different types of gaming machines. In particular, the three camera positions have different vertical offsets from each other ($W_a$, $W_b$, and $W_c$). To account for the height of the player 701 ($h$) and a range of potential player heights ($\Delta h$), the camera has an FOV of approximately 120° ($\Theta W_a$, $\Theta W_b$, and $\Theta W_c$). In other embodiments, the camera may have any suitable FOV for capturing images of at least a portion of the player area in which player faces may be detected.

Figure 8:
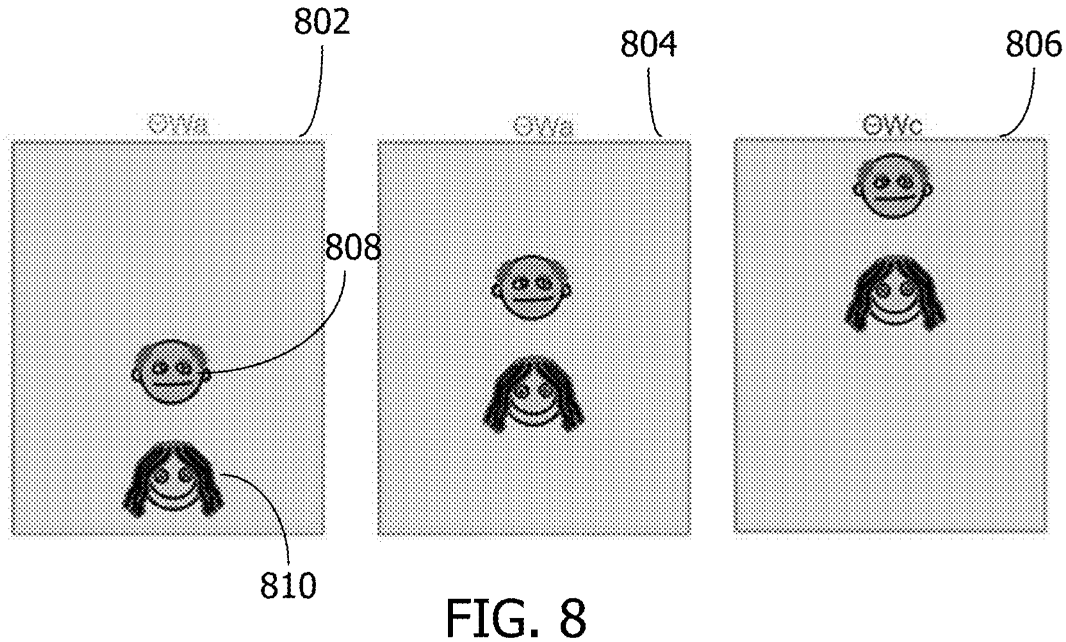
FIG. 8 depicts several example images captured by the wide field-of-view camera of the system shown in FIG. 7 according to one or more embodiments of the present disclosure.

FIG. 8 depicts three example images 802, 804, and 806 as captured by the camera at the three mounting positions $W_a$, $W_b$, and $W_c$. Two example player faces 808, 810 are shown to illustrate the variance between players of different height (i.e., $\Delta h$). Unlike the images in FIG. 1B, the player faces 808, 810 are captured in their entirety for all three mounting positions. The wide FOV enables the camera to capture images 802, 804, 806 representing a relatively larger portion of the player area in comparison to some narrow or standard FOV cameras. The increased portion of the player area covered by the camera facilitates a plurality of camera mounting positions without requiring specialized hardware for each different configuration.

However, the increased coverage of the player area within the captured image may result in a portion of the image being irrelevant for facial detection and identification. For example, the three images 802, 804, 806 of FIG. 8 include portions in which the system 100 (shown in FIG. 6) assumes is unlikely to include the player's face (e.g., the upper portion of the image 802 associated with the camera mounting position $W_a$). Accordingly, the system 100 may be configured to extract one or more areas of interest from the captured image for face detection.

In some embodiments, the logic circuitry 140 (shown in FIG. 6) may be configured to segment or divide the captured image into a plurality of image segments. These image segments may be defined, for example, using pixel coordinates representing the boundaries of the image segments and/or other features of the image segments. For example, for a circular image segment, the pixel coordinates may represent an origin or center coordinate and may be paired with a radius value to define the circumference of the circle segment. The image segments may be uniform or vary (i.e., heterogeneous) in size and/or shape. For example, the image may be divided into a plurality of rectangular or square segments having uniform shape and size. In another example, the image may be divided into two image segments: one segment in which player faces are expected to be present and a second segment in which player faces are not expected. The image segments may remain predefined for a plurality of images due to the fixed image resolution (i.e., number of pixels and aspect ratio of the pixels) of images captured by the image sensors 110 and the fixed position and orientation of the image sensors 110 relative to the gaming machine 102, or the image segments may be dynamically adjustable in response to one or more trigger conditions as described in detail further below.

In the example embodiment, the logic circuitry 140 is configured to establish a facial image mask based on the image segments and the physical orientation and location of the image sensors 110 relative to the player area. The facial image mask may be used to identify which image segments (or, more broadly, which pixels of the captured image) represent a portion of the player area in which player faces are expected. As seen in FIGS. 7 and 8, the different mounting positions of the camera on the gaming machine 102 result in the player faces to be present in different areas of the captured images. The facial image mask, when applied to a captured image, enables the logic circuitry 140 to extract one or more subsections of the image for facial detection and identification. For example, the logic circuitry 140 may extract one or more image segments from the image based on the facial image mask. The facial image mask may include pixel coordinates, a masking map (i.e., a 1:1 map to the pixels of the captured, where each 'pixel' value of the masking map indicates whether or not the corresponding pixel of the image is within the area of interest for facial detection), and/or other suitable data for defining the area of interest within the image, such as data identifying which image segments define the area of interest. It is to be understood that the image facial mask may explicitly define at least one of the following: (i) the area of interest within the image, (ii) one or more areas that are not of interest for facial detection (thereby implicitly defining the area of interest), and/or (iii) one or more boundaries separating the area of interest from the remaining portion(s) of the image.

To establish the facial image mask, the logic circuitry 140 may retrieve a predefined image facial mask associated with the gaming machine 102. With respect again to FIG. 6, the gaming machine 102 is in communication with the machine database 106. In some embodiments, the machine database 106 is in communication with other devices, such as a portable computing device associated with a technician. The portable computing device may be an intermediary between the gaming machine 102 and the machine database 106, where data from the gaming machine 102 and/or the machine database 106 is retrieved by the portable computing device to be uploaded to the other device. For example, during an installation process of the gaming machine 102, the portable computing device may retrieve data from the machine database 106 to be installed on the gaming machine 102.

The machine database 106 stores a plurality of facial image masks associated with a plurality of gaming machines (including the gaming machine 102). The facial image masks stored within the machine database 106 may be initially defined and stored by a manufacturer or designer of the gaming machines. In certain embodiments, the stored facial image masks may be updated in response to changes to configurations of the gaming machines and/or in response to field use of the gaming machines, which may reveal the initially defined facial image mask for a given gaming machine is too broad or too narrow. The dynamic updating may facilitate improved computational efficiency and/or accuracy in applying the facial image mask by the logic circuitry of the gaming machines. The facial image masks may be linked to a machine identifier and/or other data associated with a gaming machine. The machine identifier is a unique identifier linked to a particular gaming machine. The machine identifier may be a single value or a combination of values. In some embodiments, a gaming machine may be linked to a plurality of machine identifiers if the gaming machine has a plurality of configurations.

The logic circuitry 140 may be configured to retrieve a facial image mask associated with the gaming machine 102 from the machine database 106 by performing a lookup using the machine identifier of the gaming machine 102. The machine identifier may be a known value stored in the memory of the logic circuitry 140, such as a serial number. If a matching facial image mask is detected in response to the lookup, the logic circuitry 140 retrieves the facial image mask and stores the mask for subsequent use in response to a captured image. In other embodiments, the logic circuitry 140 does not retrieve a predefined facial image mask. For example, the logic circuitry 140 may automatically define the facial image mask in response to training data (i.e., a plurality of images with known pixel coordinates of faces) and/or real-time images from the gaming machine 102. In another example, a technician may calibrate the facial image mask during an installation or maintenance process for the gaming machine 102. In such examples, the logic circuitry 140 may cause the gaming machine 102 to present a graphical interface including an image preview from the image sensors 110 to enable the technician to manually define the facial image mask. In the embodiments in which the facial image mask is defined and/or updated at the gaming machine 102, the facial image mask may be transmitted to the machine database 106 to enable other similar gaming machines to retrieve the facial image mask.

Figure 2:
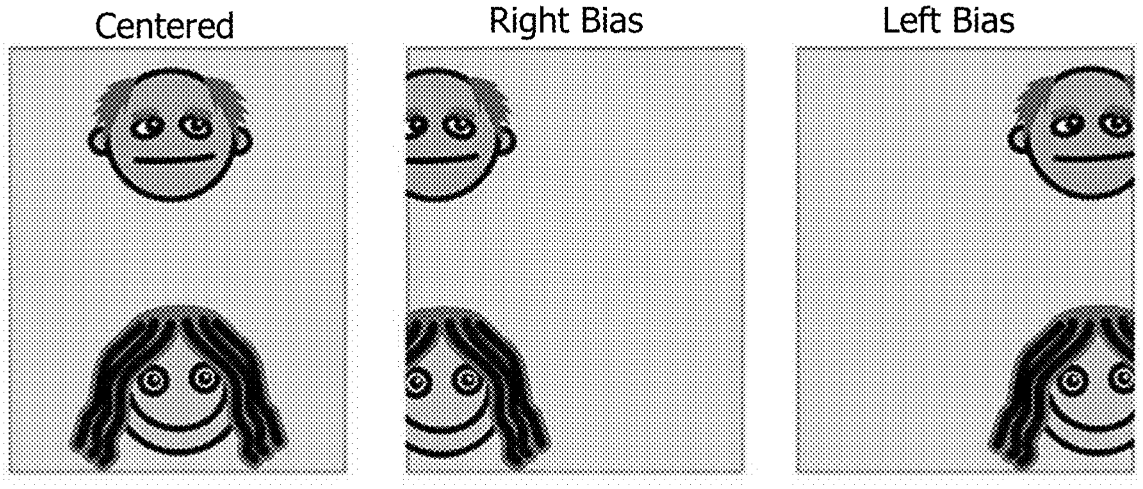
PRIOR ART FIG. 2
FIG. 2 depicts three example images captured by one or more example prior art gaming systems having different horizontal camera mounting points on a gaming machine.
Figure 9:
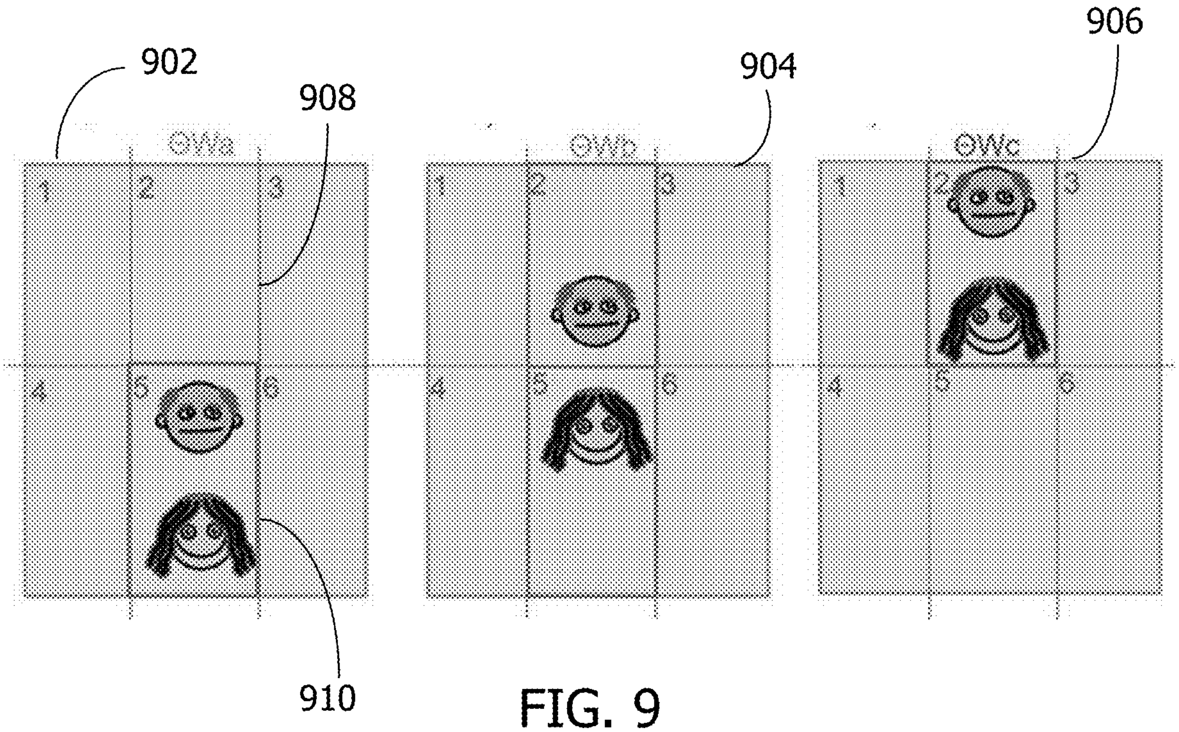
FIG. 9 depicts example image segmentation of the example images shown in FIG. 8 according to one or more embodiments of the present disclosure.
Figure 10:
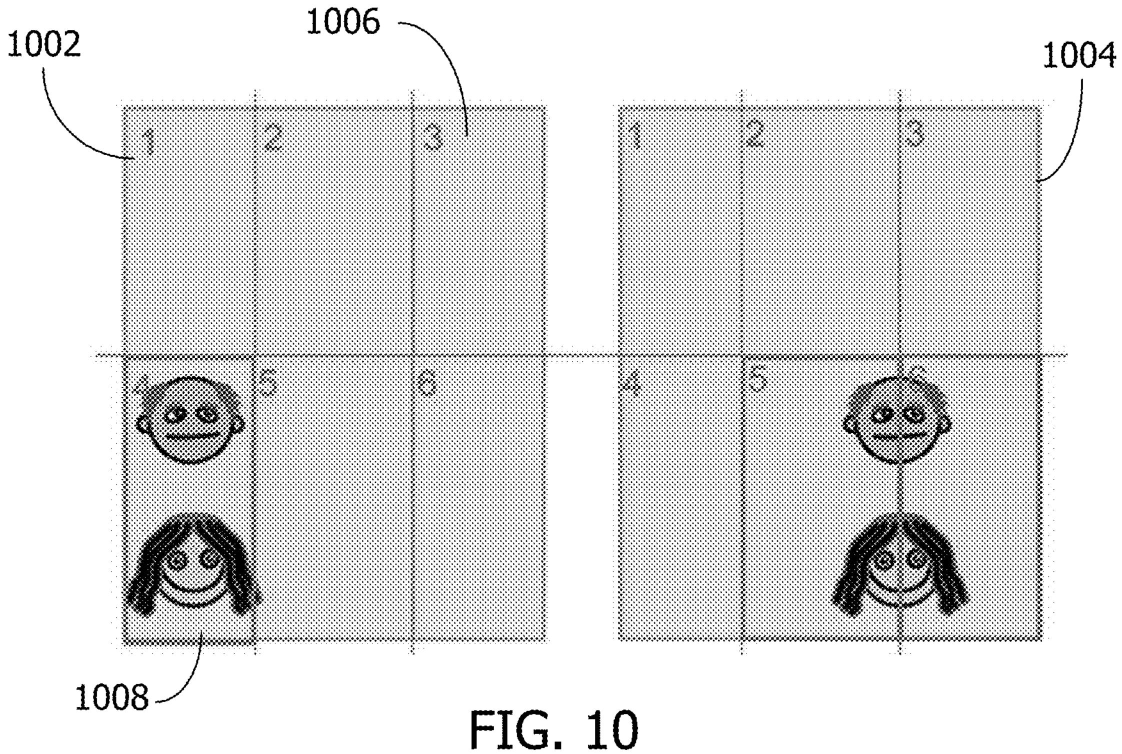
FIG. 10 depicts example image segmentation for captured images with horizontal shifts according to one or more embodiments of the present disclosure.

FIGS. 9 and 10 depict a series of images captured by a camera of the gaming machine 102 in a plurality of mounting positions and a facial image mask applied to the images. In particular, the images 902, 904, 906 of FIG. 9 correspond to the images captured in FIG. 8, and the images 1002, 1004 of FIG. 10 correspond to images captured by a camera that is horizontally offset on the gaming machine 102 similar to the images captured in FIG. 2 of the prior art. In the example embodiment, each image has been divided into six rectangular image segments 908, 1006. In other embodiments, the images may be divided into a different number of images segments or have a different configuration of image segments. Each image also has a facial image mask 910, 1008 corresponding to the different mounting positions of the camera on the gaming machine 102. The facial image mask 910, 1008 defines which image segments 908, 1006 correspond to the area of interest for player facial detection.

In particular, in FIG. 9, the facial image mask 910 of the image 902 associated with mounting position $W_a$ includes the image segment 908 labeled '5', the facial image mask 910 of the image 904 associated with mounting position $W_b$ includes the two image segments 908 labeled respectively '2' and '5', and the facial image mask 910 of the image 906 associated with mounting position $W_c$ includes the image segment 908 labeled '2'. In FIG. 10, the facial image mask 1008 associated with the image 1002 includes the image segment 1006 labeled '4', and the facial image mask 1008 associated with image 1004 includes the two image segments 1006 labeled respectively '4' and '5'. If the faces within the images of FIGS. 9 and 10 are assumed to be approximations of the expected range of player heights, then the facial image masks 910, 1008 are applied to capture all or a substantive majority of player faces within images captured by the camera of the gaming machine 102. As the camera typically remains fixed in its location and captured images are of a fixed image resolution, the facial image mask 910, 1008 may also be applied to subsequent captured images.

In some embodiments, the facial image mask may be dynamic to capture player faces positioned outside of the image segment(s) representing the area of interest in the player area. In particular, the facial image mask may be configured to expand to include additional image segments in response to the facial image detection (described further below) resulting in no player face detected in the area of interest. In one example, the player may be at an irregular position relative to the gaming machine 102 (e.g., the player is slouching sideways in a chair or stool at the gaming machine 102). In another example, the default facial image mask may be established with outlier player heights (i.e., players having a relatively high or low heights h as defined in FIG. 7) excluded. In the example embodiment, the facial image mask may be updated by specifying which additional image segments 902 to add to the facial image mask, such as the image segments 902 adjacent to the default facial image mask. In some embodiments, the updated facial image mask may be stored for subsequent use in upcoming images. In other embodiments, the facial image mask may return to the default state after being applied to the current image.

Figure 11:
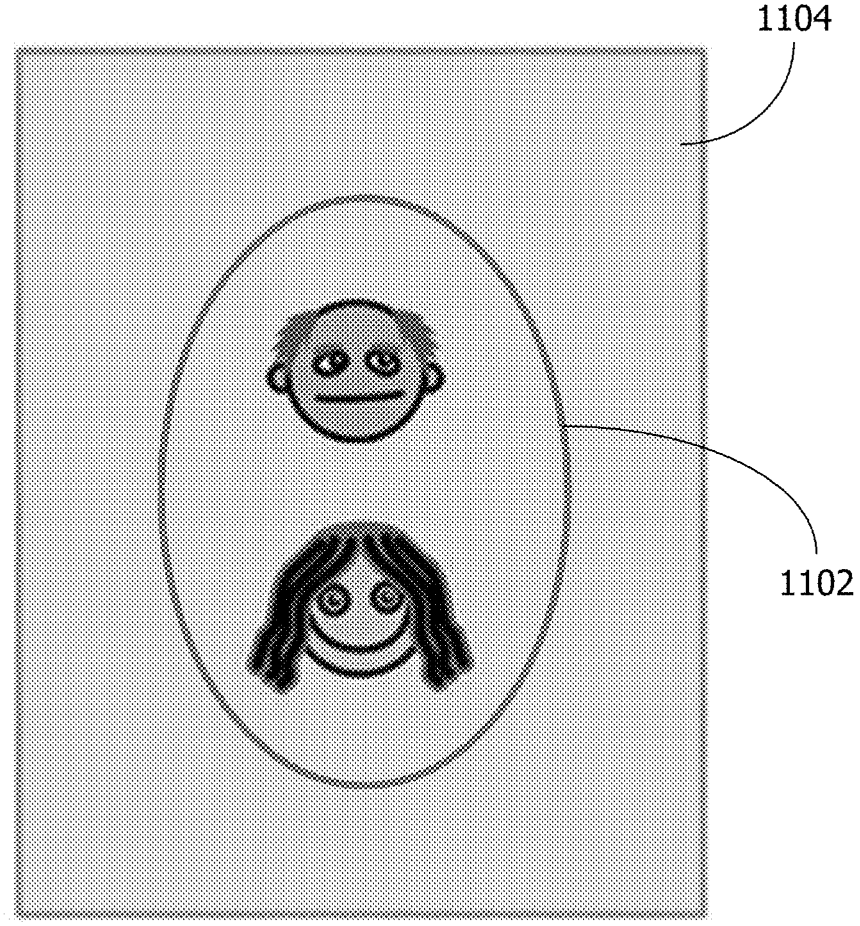
FIG. 11 is an example image depicting an example facial mask applied to an image according to one or more embodiments of the present disclosure.

FIG. 11 depicts another suitable facial image mask 1102 applied to an image 1104. In the example embodiment, in contrast to FIGS. 9 and 10, the facial image mask 1102 is untethered from predefined image segments. This enables the facial image mask 1102 to segment the image into at least two subsections: the area of interest for facial detection, and any remaining areas assumed to be (at least initially) irrelevant to facial detection. The facial image mask 1102 may facilitate a reduction in computational resources allocated to facial detection by reducing the amount of pixels of the image that are analyzed for faces, whereas the image segmentation shown in FIGS. 9 and 10 may facilitate reduced computation resources allocated to the application of the facial image mask and extracting the portion of the image associated with the area of interest due to the reduced complexity of the facial image mask. The facial image mask 1102 may be defined by one or more pixel coordinates, geometric parameters (e.g., radius, height, length, etc.) and/or other suitable parameters that can be applied to the underlying image 1104 for extracting the area of interest. The facial image mask 1102 may be initially defined through manual and/or automated analysis of a plurality of images of players at the gaming machine to establish to the area of interest and, by extension, the facial image mask 1102. The facial image mask 1102 may then be stored in memory (e.g., the machine database 106 shown in FIG. 6) to be retrieved by the gaming machine corresponding to facial image mask 1102.

In certain embodiments, the facial image mask 1102 is dynamic such that the facial image mask 1102 may be configured to expand and/or contract relative to the pixel coordinates of the image 1104. For example, if no player is detected within the area of interest defined by the facial image mask 1102, the facial image mask 1102 may be expanded to define a larger area of interest to perform facial detection again. In another example, if too many faces are detected in the area of interest (e.g., a crowd has formed behind the player), the facial image mask 1102 may be contracted exclude some or all faces associated with bystanders. Distinguishing between players and bystanders may be passive (i.e., no determination is explicitly made to define different faces as a player face or a bystander face), where the contraction of the facial image mask 1102 is predefined to narrow the area of interest to avoid areas likely to include bystanders. For example, the facial image mask 1102 may be narrowed along a horizontal diameter or a vertically upward radius to account for bystanders standing above or next to the player. In other embodiments, preliminary image analysis, textual parameters from the gaming machine, and/or additional sensors (e.g., proximity sensors) may be used to actively establish which face corresponds to the player. In some embodiments, rather than distinguish between bystanders and players, the contraction of the facial image mask 1102 may be used to distinguish between bystanders observing the gaming machine and any passersby not engaged with the gaming machine but merely captured in the image 1104. That is, the facial detection and identification may not be limited to the player, but may also include at least some bystanders.

The changes to the facial image mask 1102 may be configured to occur in series of predefined steps (e.g., the facial image mask 1102 expands a predefined amount if no faces are detected), or the changes may be applied using artificial intelligence (AI) and/or machine learning (ML), where historical and/or contextual data from the current image 1104 and/or previous images are used to influence the change in the facial image mask 1102. For example, AI and ML may be used to recognize body parts other than faces within the image 1104. If a torso is detected, the facial image mask 1102 may be expanded to cover pixels likely to include the face corresponding to the torso. In embodiments in which logic circuitry (e.g., the logic circuitry 140, shown in FIG. 6) employ AI and/or ML in adjusting the facial image mask 1102, adjustments to the facial image mask 1102 and/or the parameters of the AI and the ML may be transmitted via a network to other gaming machines (or stored in a database accessible by other gaming machines).

Any changes to the facial image mask 1102 may be applied for subsequent images or the facial image mask 1102 may revert to a default state (such as the state shown in FIG. 11). In some embodiments, the logic circuitry of the gaming machine (e.g., the logic circuitry 140, shown in FIG. 6) may be configured to generate and maintain a record of instances in which the facial image mask 1102 is changed and where the face of the player is detected within the image 1104. If a pattern is detected within the changes of the facial image mask 1102, the default state of the facial image mask 1102 and/or the facial image mask 1102 stored within memory (e.g., the machine database 106) may be updated. For example, if the default facial image mask 1102 is routinely expanded to include player faces detected to the right of the facial image mask 1102, the default facial image mask 1102 may be expanded to include the pixel coordinates in which the faces are typically detected. It is to be understood that the expansion and contraction of the facial image mask 1102 may not be limited to uniform geometrical changes, and the changes may be incorporated using any suitable parameters for defining the facial image mask 1102.

In at least some embodiments, the captured image may appear to be warped due to the wide FOV nature of the camera. That is, the captured image may have 'fisheye' appearance in which objects within the captured image appear stretched. This stretched appearance may cause issues with some facial detection and identification processes, and therefore the captured image may be processed via a de-warping process to cause the objects (particularly, faces within the captured image) to appear in a natural, un-stretched state. In certain embodiments, the de-warping process may be limited to the area of interest within the captured image to reduce the computational burden of the de-warping process.

Figure 12:
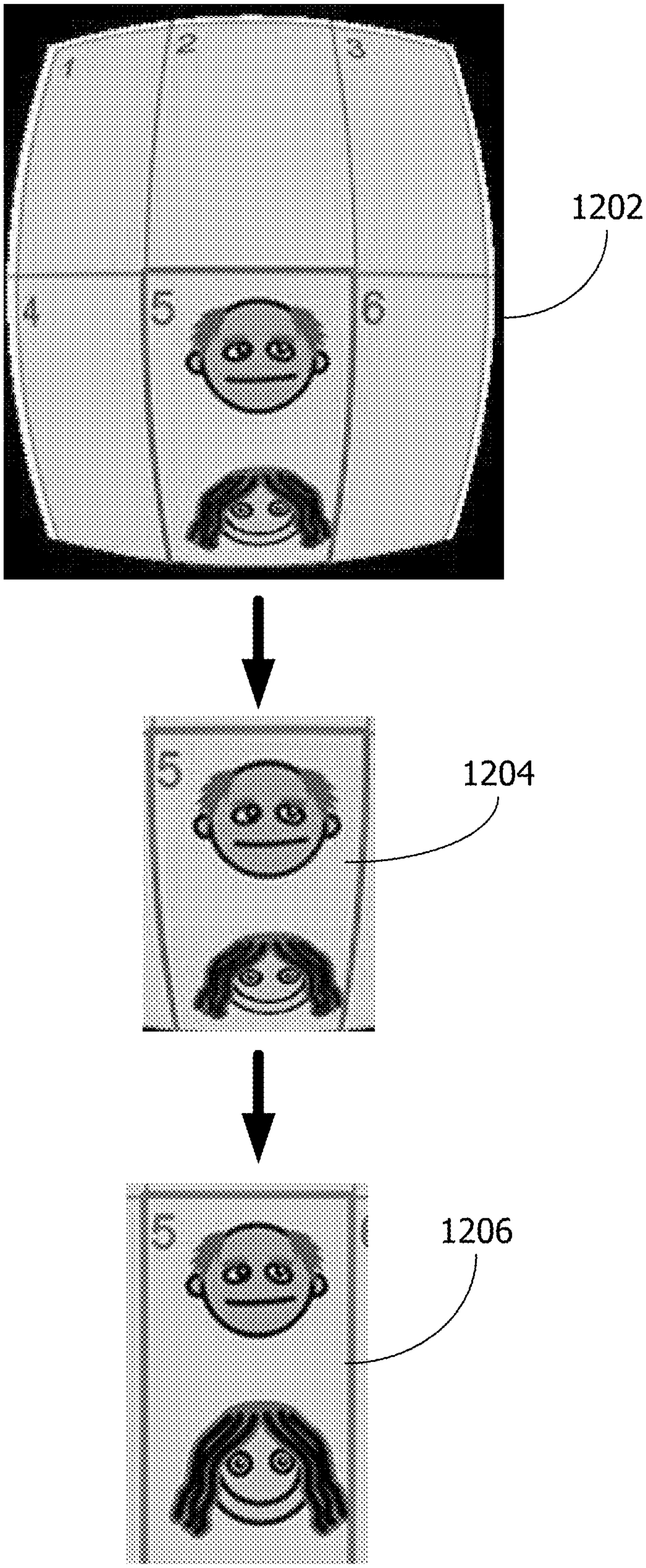
FIG. 12 is an example progression of de-warping a distorted image according to one or more embodiments of the present disclosure.

FIG. 12 depicts an example de-warping process. More specifically, FIG. 12 includes a captured image 1202, an extracted area of interest 1204, and a resulting de-warped image 1206. The captured image 1202 has a warped or fisheye appearance in which faces within the image 1202 are distorted due to the manner in which the image sensors receive light to form the captured image 1202. In the example embodiment, a facial image mask is applied to the captured image 1202 to divide the captured image 1202 into a plurality of image segments. The facial image mask may be warped to account for the warped or distorted nature of the image 1202, or the facial image mask may be established without regard to the distortion of the image 1202, similar to the facial image masks of FIGS. 9 and 10.

In the example embodiment, the de-warping is limited to the area of interest for facial detection and identification to reduce computational resource allocation. In other embodiments, the entire image 1202 may be input to the de-warping process. The extracted area of interest 1204 corresponds to the image segment labeled '5' in the illustrated example, though the extraction may be different for different areas of interest. The extracted area of interest 1204 may then be input into a de-warping function (or set of functions) to generate the de-warped image 1206. The de-warping function may be configured to scale, along a gradient the de-warped image 1206 based on the pixel coordinates of the extracted area of interest 1204 relative to the captured image 1202. That is, pixel values of the extracted area of interest may be condensed and/or relocated based at least partially the radial distance and location of the pixel values relative to the origin of the captured image 1202 to generate the pixel values of the de-warped image 1206. Other suitable de-warping functions may be used to generate a de-warped image for facial detection and identification as described herein.

With respect again to FIG. 6, the logic circuitry 140 applies the facial image mask to the captured image from the image sensor 110 to extract player image data from the image. The player image data is to plurality of pixels from the image that represent the area of interest. The logic circuitry 140 is configured to perform facial detection using the player image data, and the remaining pixels of the image are ignored for facial detection, thereby reducing the computational burden of the facial detection process on the logic circuitry 140. The remaining portions of the image may be deleted, or the image as a whole may still be stored for subsequent reference and/or any changes to the facial image mask. For example, if the facial image mask is expanded, new player image data is extracted from the image for additional facial detection. In some embodiments, the logic circuitry 140 may extract a plurality of player image data representing multiple areas of interest from a single image. For example, the gaming machine 102 may be configured for conduct a gaming involving multiple players seated at the gaming machine 102 (or a plurality of devices associated with the gaming machine 102. To identify each player, the logic circuitry 140 may apply a plurality of facial image masks (or a single facial image mask defining the multiple areas of interest) to the image or set of images to extract the player image data for each player position at the gaming machine 102.

Facial detection may be performed using any suitable process that can recognize patterns in a plurality of pixels as representing a particular object or person. For example, one or more neural networks may be used by the logic circuitry 140 to identify faces within the player image data. Neural networks, in a computing environment, are pattern recognition systems that receive "raw" input data (e.g., pixels of image data), recognize patterns within the input data, and output one or more classifications of the input data based on the recognized patterns. To recognize these patterns and properly classify the patterns, the neural networks are trainable systems that dynamic adjust in response to feedback regarding the output of the neural networks. In the context of facial image detection, the neural networks may be trained using a relatively large set of training data (i.e., images including human faces at vary angles, orientations, and the like and images not including any human faces) to adapt the neural networks to recognize patterns within input image data that represent faces. In response to the trained neural network receiving player image data, the trained neural network may output an annotated image, image mask, and/or other suitable output that identifies any detected faces within the player image data and where the detected faces are located within the player image data. The location may then be used to extract the pixels of the player image data that represents a face to further identify the player. In the example embodiment, the neural networks are stored and executed locally by the logic circuitry 140. In some embodiments, the neural networks are stored and/or executed remotely from the logic circuitry 140 (e.g., by a server in communication with the logic circuitry 140, such as the player-tracking server 104). In other embodiments, other suitable processes and/or tools may be used to detect faces within the player image data.

In response to no face being detected within the player image data, the logic circuitry 140 may be configured to determine whether or not a player is expected to be at the gaming machine 102 and/or expand the facial image mask to determine if the player's face is merely positioned outside of the player image data. The logic circuitry 140 may analyze sensor data and/or game data to determine whether or not a player is likely to be present at the gaming machine 102. For example, a presence or proximity sensor in communication with the logic circuitry 140 may be configured to collect presence sensor data that may indicate the presence or absence of a player. In another example, the game data may indicate user input received from the player for play of one or more games. If not user input has been detected for a period of time, this may indicate the player is not currently engaged at the gaming machine 102. In certain embodiments, the logic circuitry 140 may be configured to cause the image sensor 110 to capture an image periodically until a player face is detected. In other embodiments, the gaming machine 102 may be configured to prompt the player to align his or her face within the area of interest. For example, the gaming machine 102 may display a preview image to the player from the image sensor 110 with guiding graphical elements representing the facial image mask with instructions to align his or her face within the guiding graphical elements. In such an example, the player may initiate the process of capturing an image for player identification in addition to or in place of the system 100 automatically identifying the player. This may enable the player to have enhanced control over player identification while maintaining the benefit image-based player identification (e.g., no manual entry of player identification information or carrying a physical device for identification).

In the example embodiment, after a player's face has been detected, the logic circuitry 140 is configured to identify the player. To identify a player, the logic circuitry 140 may be configured to compare the pixels representing the detected face or features of the detected face to a plurality of player images having known identities. In the example embodiment, the player database 108 is configured to store the plurality of player images and/or sets of facial features. As used herein, "facial features" may refer to one or more aspects of a player's face (e.g., nose, cheeks, eyes, eyebrows, etc.) represented in a format comparable to an image of a face. In one example, the facial features are represented by their relative size, shape, and/or location. A player image may be considered a set of facial features. Each stored player image or set of facial features may be linked to a player identifier (e.g., player name, unique value representing the player, etc.) and/or a player account associated with a respective player. In one example, the player image and/or set of facial features for a player is stored from a registration process for the player account (or at least registration for an image identification feature of the player account). The player accounts may be used to track historical activities of the player and facilitate awarding players based on the historical activities. For example, a bonus feature of a game, a coupon (e.g., a free drink), and/or other suitable awards may be provided to the player based at least partially on the player's historical activities, such as achieving a certain playtime, wager amount, or award amount. In some embodiments, the player database 108 may also be configured to store anonymous player images linked to anonymous player accounts for players that have not registered for a player account. This feature may enable the player to register for a player account and retain a record of the activities from the anonymous account.

In the example embodiment, a lookup query is performed within the player database 108 using at least the output of the neural network and/or the player image data to identify the player. For example, a set of facial features may be identified on the detected face that, when analyzed collectively or individually, may uniquely identify the player, This set of facial features may be used to query the player database 108 for any existing player account associated with the facial features. It is to be understood that the query may not be limited to comparing the player image data directly to the stored data in the player database 108, but that the logic circuitry 140 may be configured to perform one or more processes to extract or distill certain features of the player image data for the comparison. In certain embodiments, the logic circuitry 140 may be configured to identify a player's identity using other suitable methods of facial identification, such as holistic, non-feature based approaches. If a match is detected, the corresponding player account may be linked to the activities of the player on the gaming machine 102. For example, any events or metrics of gaming session of the player on the gaming machine 102 may be recorded within the player account associated with the player. The logic circuitry 140 may be configured to store an account identifier to link the player account to the activities of the player. That is, data generated and/or communicated by the logic circuitry 140 may include the account identifier to identify the player account associated with a particular event or activity. If no match is detected within the player database 108, the logic circuitry 140 may be configured to generate an anonymous player account for subsequent tracking. In other embodiments, the logic circuitry 140 may not generate an anonymous player account. In such embodiments, the logic circuitry 140 may notify the player to register for a player account to receive the benefits and features associated with a player account.

The player account may remain linked to the gaming machine 102 until a termination condition is detected indicating that the player is no longer engaged at the gaming machine 102. For example, the player may manually terminate the gaming session (i.e., initiating a "card-out" process). In another example, one or more sensors (including the image sensors 110) may collect sensor data indicate the presences or absence of the player at the gaming machine 102. If the player is not detected at the gaming machine 102 for a period of time, the logic circuitry 140 may be configured to initiate the termination process.

Although the system 100 is described above with the logic circuitry 140 performing the player image data extraction, facial detection, facial identification, and player account linking, it is to be understood that at least some embodiments incorporate other devices that perform these functions and/or other functions described herein. For example, the player-tracking server 104 may be configured to perform all, some, or none of the functions of the logic circuitry 140. In one example, the gaming machine 102 may be a thin client machine, and the player-tracking server 104 and/or other servers in communication with the gaming machine 102 are configured to perform at least some of the functions of the logic circuitry 140. In another example, the player-tracking server 104 may be configured to handle player identification as an intermediary between the gaming machine 102 and the player database 108. The player-tracking server 104 includes server logic circuitry 142 similar to the logic circuitry 140 of the gaming machine 102 to perform at least some of the functions of the logic circuitry 140. The player-tracking server 104 may be configured to focus specifically on functionality regarding player tracking, or the player-tracking server 104 may be configured to be multifunctional. For example, the player-tracking server 104 may be configured to conduct a wagering game for presentation at the gaming machine 102.

In at least some embodiments, the player-tracking server 104 is in communication with a plurality of gaming machines. In certain embodiments, the player-tracking server 104 may be in communication with stand-alone cameras that capture images including an area of interest. These stand-alone cameras may be used, for example, in combination with a gaming table, a sports book area, and/or another area in which players or other parties of interest may be detected and linked to an account.

Figure 13:
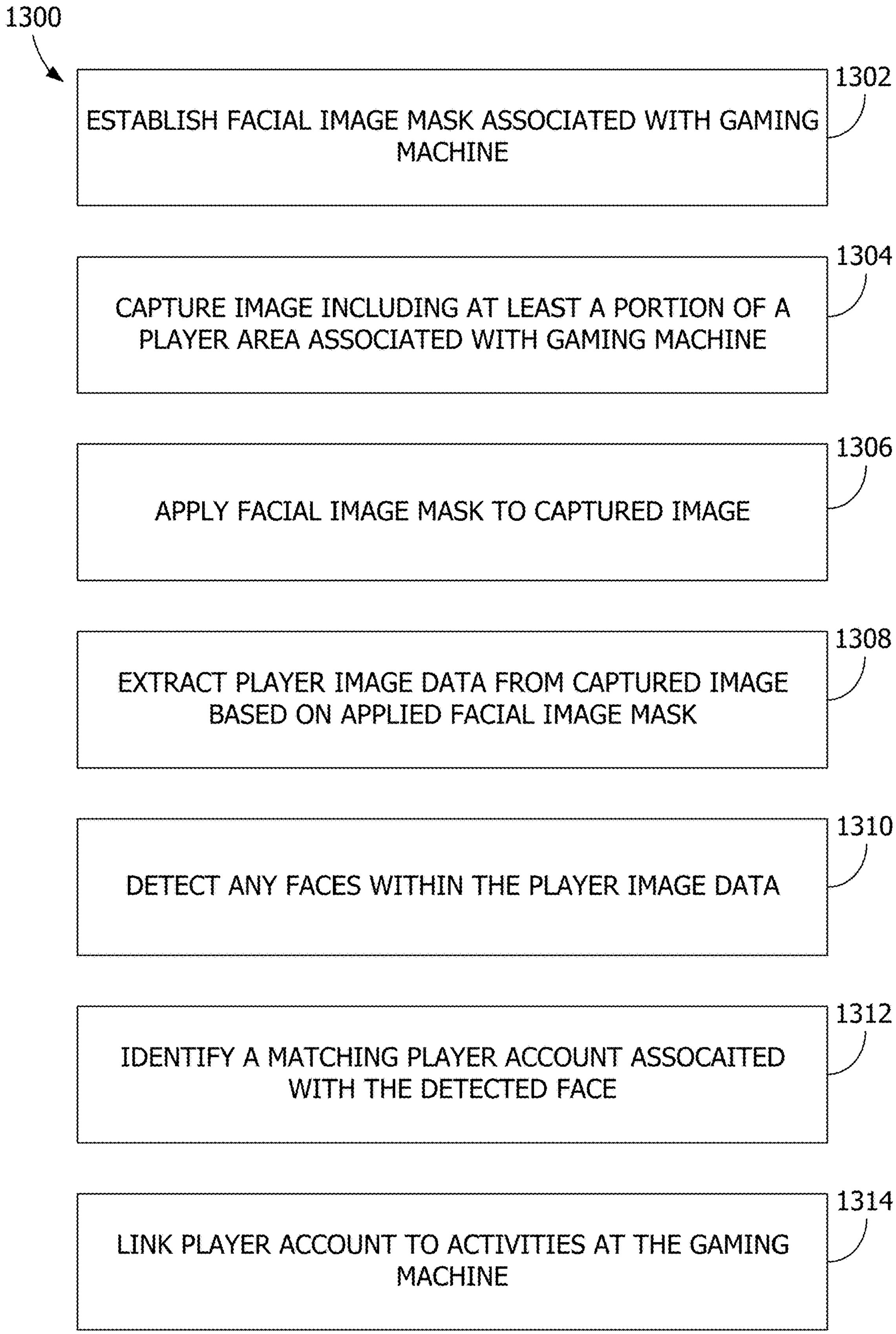
FIG. 13 is a flow diagram of an example method of providing player tracking using a gaming system with one or more wide field-of-view cameras according to one or more embodiments of the present disclosure.

FIG. 13 illustrates a flow diagram of an example method 1300 for image-based player tracking using the system 100. The method 1300 is performed at least partially by the logic circuitry 140 of the gaming machine 102. In other embodiments, the method 1300 may include additional, fewer, or alternative steps performed by the logic circuitry 140 and/or another suitable component (e.g., the logic circuitry 142 of the player-tracking server 104), including those described elsewhere herein.

In the example embodiment, the logic circuitry 140 establishes 1302 a facial image mask associated with the gaming machine 102. That is, the logic circuitry 140 may retrieve a predefined facial image mask associated with the gaming machine 102 locally (i.e., the facial image mask has been stored within the memory of the logic circuitry 140, such as by a technician during an installation of the gaming machine 102) or retrieve the predefined facial image mask from an external source, such as the machine database 106. The facial image mask may then be stored for subsequent use in detecting and identifying players.

The logic circuitry 140 is configured to cause the one or more image sensors 110 to capture 1304 an image including at least a portion of a player area associated with the gaming machine 102. More specifically, the image sensors 110 are configured to capture an area of interest within the player area in which a player's face is expected when participating at the gaming machine 102. In some embodiments, the image sensors 110 capture 1304 the image in response to one or more trigger conditions. For example, the logic circuitry 140 may rely upon sensors (e.g., presence sensors) or user input at the gaming machine 102 to indicate that a player may be at the gaming machine 102 to initiate a gaming session. In other embodiments, the image sensors 110 may be configured to capture 1304 the image periodically.

The logic circuitry 140 then receives the captured image and applies 1306 the established facial image mask to the captured image. In this context, "applying" the facial image mask involves an overlap of the facial image mask with the captured image, and the facial image mask divides the image into a plurality of segments having respective definitions. In particular, the facial image mask defines the portion or portions of the captured that are considered initially relevant to facial detection and/or identification. The logic circuitry 140 then determines which pixels of the captured image correspond with the area defined as relevant for facial detection and/or identification by the facial image mask by comparing pixel coordinates and/or other suitable data of the facial image mask to the pixel coordinates of the captured image. The logic circuitry 140 then extracts 1308 the player image data representing the area of interest for facial detection from the captured image data based on the application 1306 of the facial image mask. The player image data may simply be a subsection of the captured image (i.e., a plurality of pixel values arranged in matrix and any suitable associated metadata), or the player image data may be converted to a format suitable for facial detection and identification. For example, if the captured image is warped in a 'fisheye' manner in which objects appear stretched towards the boundary of the image, the logic circuitry 140 may be configured to perform a de-warping process with the player image data to reduce or otherwise eliminate the stretched appearance of any faces within the player image data. Other suitable conversions and/or additions may be made to the player image data to facilitate facial detection and identification as described herein.

In the example embodiment, the logic circuitry 140 detects 1310 any faces within the player image data using one or more neural networks trained to identify patterns in pixels of the player image data as faces or other objects. In other embodiments, the logic circuitry 140 may incorporate additional or alternative image analysis tools and processes suitable for detecting faces within the player image data. If no faces are detected, the logic circuitry 140 may update the facial image mask to expand to cover additional pixels within the captured image in case the player's face is not in the area of interest (e.g., the player is slouching or the player is positioned off to the side of gaming machine 102). The logic circuitry 140 then applies 1306 the updated facial image mask to detect again if any player faces are within the area corresponding to the updated facial image mask. In certain embodiments, the logic circuitry 140 may cause the gaming machine 102 to prompt the player to align his or her face within the area of interest to facilitate player tracking. If no face is detected after the additional steps, the logic circuitry 140 may assume that no player is present and, in some embodiments, initiate a termination sequence if a gaming session is currently being conducted on the gaming machine 102.

If more than one face is detected 1310, the logic circuitry 140 may be configured to determine which detected face corresponds to the player rather than a bystander. In one example, the logic circuitry 140 may rely upon sensor data collected by one or more sensors associated with the gaming machine 102 to locate the player. The sensor data may include, but is not limited to, presence sensor data, biometric data, user input data, and the like. The sensor data may be analyzed in combination with the captured image to determine where the player is likely to be within the captured image. In another example, the logic circuitry 140 may cause the gaming machine 102 to prompt the player to confirm his or her identity via user input (including verbal and/or gesture-based user inputs). In such an example, the logic circuitry 140 may perform player identification for each face within the player image data or establish an order in which the faces are identified. The prompt may be anonymized to some degree to protect the personal information of the player and bystanders, but may, for example, ask the player to select the last game they played or the last time they visited from a list of choices to confirm his or her identity. In yet another example, the logic circuitry 140 may use contextual clues within the captured image to distinguish the player. For example, if the image sensors 110 are mounted above the typical player height, the logic circuitry 140 may assume that a face detected in the bottom center of the captured image is the player. If only one face is detected in the player image data, the logic circuitry 140 may assume that the face is associated with the player.

In response to determining which face is the player's face, the logic circuitry 140 then identifies 1312 a player account associated with the face and, by extension, the player. More specifically, facial features are extracted from the detected face and compared to a database (e.g., the player database 108) that stores a plurality of player accounts linked to respective sets of facial features. If the extracted facial features substantially match the facial features associated with a stored player account, the player account is retrieved and the player account is linked 1314 to the activities of the player at the gaming machine 102. The activities (e.g., wagering, game events, awards, food and beverage orders, etc.) may be stored as part of the player account to facilitate one or more features associated with the player account, such as providing the player an award for historical wagering or gameplay, or linking a digital wallet associated with the player account to the gaming session at the gaming machine 102, thereby enabling the player to establish a credit balance with funds from the digital wallet. Linking the player account may include the logic circuitry 140 storing one or more account identifiers that is appended to reporting performed in response to the activities at the gaming machine 102. This reporting may include the local storage of the activities and the external reporting, such as messages to a gaming or accounting server. The format of the reporting may natively include one or more data elements dedicated to the account identifiers.

The link between the player account and the activities at the gaming machine 102 may persist until one or more termination conditions are detected. The termination conditions may indicate that the player has concluded the gaming session or is unlinking the player account from the gaming session. For example, if the player initiates a 'cash-out' process in which the credit balance is returned to the player either digitally (e.g., via a digital wallet) or physically, such as by a printed ticket, the link the player account may be terminated. In another example, the gaming machine 102 may give the player the ability to 'log-out' of his or her player account within the gaming session. This may be useful, for example, if a plurality of players are taking turns playing within a single gaming session. The termination process may include reporting the termination for storage in memory with the player account and removing the account identifiers from memory of the gaming machine 102.

In some embodiments, if no player account matches the player features from the detected image, the logic circuitry 140 may be configured to generate and store an anonymized player account for tracking the player's activities. The player may be provided the option at the gaming machine 102 or elsewhere (e.g., via an application installed on the player's phone, tablet, or computer) to 'claim' or associate the player account with his or her identity while maintaining the benefit of the tracked activities from the anonymized player account. In certain embodiments, the player may decline or otherwise remove the anonymized player account at his or her request.

As mentioned above, the method 1300 may be performed using the player-tracking server 104 in combination with (or instead of) the logic circuitry 140. That is, the player-tracking server 104 may receive the captured image or player image data from the logic circuitry 140 to conduct facial detection and/or identification. The player-tracking server 104 may then retrieve the matching player account and transmit the account identifier of the matching player account to the gaming machine 102. In some embodiments, messages sent from the gaming machine 102 may be routed through the player-tracking server 104 to facilitate the addition of the account identifiers to the messages.

The foregoing systems and methods provide a technical solution to a technical problem. More specifically, the foregoing systems and methods use wide FOV cameras or a plurality of cameras to capture a relatively wide area in an image, thereby enabling the camera or cameras to be installed in a variety of gaming machines having different positions and orientations of the camera(s) relative to the player. Additionally, the foregoing systems and methods extract a subsection of the captured image for facial detection and identification, thereby reducing the computational and memory resources allocated to detect and identify the player. It is to be understood that the foregoing systems and methods are not limited to use with a single player gaming machine, but rather may be incorporated into systems with a plurality of gaming machines, a plurality of players at a gaming machine, and/or systems untethered to a particular gaming machine (e.g., detecting and identifying participants at a sportsbook).

Although the foregoing systems and methods describe player tracking in relation to a gaming machine, it is to be understood that the present disclosure may be incorporated into systems and methods that are not tethered to a single gaming machine. For example, the camera and player tracking described above may be used in combination with a plurality of gaming machines or for gaming systems separate from gaming machines, such as a camera system for monitor a gaming environment floor space.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A gaming machine comprising:

at least one image sensor configured to capture an image including a player area associated with the gaming machine; and logic circuitry in communication with the at least one image sensor, the logic circuitry configured to:

prior to player detection, establish a facial image mask defining an area of interest within the player area, the facial image mask based at least partially on a physical orientation and a predefined mounting location associated with the gaming machine of each image sensor of the at least one image sensor relative to the player area, wherein the facial image mask is stored for subsequent player detection;

in response to establishing and storing the facial image mask, receive the captured image from the at least one image sensor;

apply the facial image mask to the captured image to extract player image data from the captured image data, the player image data representing at least the area of interest, wherein the facial image mask is initially applied to extract a predefined set of pixels from the captured image, the predefined set of pixels less than a plurality of pixels defining the captured image;

detect any faces within the player image data;

in response to detecting a face of a player within the player image data, compare the detected face with a player database storing a plurality of player account identifiers linked to respective facial features to identify a player account associated with the player; and in response to identifying a matching player account based on the comparison, link the matching player account to activities of the player at the gaming machine.

2. The gaming machine of claim 1, wherein the logic circuitry is configured to divide the captured image into a plurality of image segments, the facial image mask comprising a subset of the plurality of image segments.

3. The gaming machine of claim 1, wherein the logic circuitry is configured to establish the facial image mask by causing a display device of the gaming machine to present a preview of the facial image mask during a calibration process, and wherein the facial image mask is updated in response to user input via the calibration process.

4. The gaming machine of claim 1, wherein the gaming machine is associated with a gaming table, and wherein the player area includes at least one player position at the gaming table.

5. The gaming machine of claim 1, wherein a first image sensor of the at least one image sensor is physically separate from a housing of the gaming machine and in communication with the logic circuitry.

6. The gaming machine of claim 1 further comprising a wide-angle camera including the at least one image sensor, wherein the logic circuitry is configured to apply a de-warping transformation to the player image data in response to extracting the player image data.

7. The gaming machine of claim 1, wherein the physical orientation and the predefined mounting location of each image sensor of the at least one image sensor is selected from a plurality of physical orientations and predefined mounting locations associated with a gaming machine type of the gaming machine.

8. A method for player tracking using a gaming system including a gaming machine and logic circuitry, the gaming machine including at least one image sensor, wherein the method comprises:

capturing, by the at least one image sensor, an image of a player area associated with the gaming machine;

prior to player detection, establishing, by the logic circuitry, a facial image mask defining an area of interest within the player area, the facial image mask based at least partially on a physical orientation and a predefined mounting location associated with the gaming machine of each image sensor of the at least one image sensor relative to the player area, wherein the facial image mask is stored for subsequent player detection;

in response to establishing and storing the facial image mask, receiving, by the logic circuitry, the captured image from the at least one image sensor;

applying, by the logic circuitry, the facial image mask to the captured image to extract player image data from the captured image data, the player image data representing at least the area of interest, wherein the facial image mask is initially applied to extract a predefined set of pixels from the captured image, the predefined set of pixels less than a plurality of pixels defining the captured image;

detecting, by the logic circuitry, any faces within the player image data;

in response to detecting a face of a player within the player image data, comparing, by the logic circuitry, the detected face with a player database storing a plurality of player account identifiers linked to respective facial features to identify a player account associated with the player; and in response to identifying a matching player account based on the comparison, linking, by the logic circuitry, the matching player account to activities of the player at the gaming machine.

9. The method of claim 8, wherein the logic circuitry is configured to divide the captured image into a plurality of image segments, the facial image mask comprising a subset of the plurality of image segments.

10. The method of claim 8, wherein establishing the facial image mask comprises causing, by the logic circuitry, a display device of the gaming machine to present a preview of the facial image mask during a calibration process, and wherein the facial image mask is updated in response to user input via the calibration process.

11. The method of claim 8, wherein the gaming machine is associated with a gaming table, and wherein the player area includes at least one player position at the gaming table.

12. The method of claim 8, wherein a first image sensor of the at least one image sensor is physically separate from a housing of the gaming machine and in communication with the logic circuitry.

13. The method of claim 8, wherein the physical orientation and the predefined mounting location of each image sensor of the at least one image sensor is selected from a plurality of physical orientations and predefined mounting locations associated with a gaming machine type of the gaming machine.

14. The method of claim 8, wherein receiving the captured image is in response to detecting player presence at the gaming machine using a proximity sensor or detecting player input at the gaming machine.

15. A gaming system comprising:

a gaming machine comprising at least one image sensor configured to capture an image of a player area associated with the gaming machine; and logic circuitry in communication with the at least one image sensor, the logic circuitry configured to:

prior to player detection, establish a facial image mask defining an area of interest within the player area, the facial image mask based at least partially on a physical orientation and a predefined mounting location associated with the gaming machine of each image sensor of the at least one image sensor relative to the player area, wherein the facial image mask is stored for subsequent player detection;

in response to establishing and storing the facial image mask, receive the captured image from the at least one image sensor;

apply the facial image mask to the captured image to extract player image data from the captured image data, the player image data representing at least the area of interest, wherein the facial image mask is initially applied to extract a predefined set of pixels from the captured image, the predefined set of pixels less than a plurality of pixels defining the captured image;

detect any faces within the player image data;

in response to detecting a face of a player within the player image data, compare the detected face with a player database storing a plurality of player account identifiers linked to respective facial features to identify a player account associated with the player; and in response to identifying a matching player account based on the comparison, link the matching player account to activities of the player at the gaming machine.

16. The gaming system of claim 15, wherein the logic circuitry is configured to divide the captured image into a plurality of image segments, the facial image mask comprising a subset of the plurality of image segments.

17. The gaming system of claim 15, wherein the logic circuitry is configured to establish the facial image mask by causing a display device of the gaming machine to present a preview of the facial image mask during a calibration process, and wherein the facial image mask is updated in response to user input via the calibration process.

18. The gaming system of claim 15 further comprising a gaming table associated with the gaming machine, wherein the player area includes at least one player position at the gaming table.

19. The gaming system of claim 15 further comprising a wide-angle camera including the at least one image sensor, wherein the logic circuitry is configured to apply a de-warping transformation to the player image data in response to extracting the player image data.

20. The gaming system of claim 15, wherein the physical orientation and the predefined mounting location of each image sensor of the at least one image sensor is selected from a plurality of physical orientations and predefined mounting locations associated with a gaming machine type of the gaming machine.

21. The gaming system of claim 15, wherein receiving the captured image is in response to detecting player presence at the gaming machine using a proximity sensor or detecting player input at the gaming machine.

* * * * *